Nov. 10, 1953  G. F. D'ALELIO  2,658,884
POLYMERIC COMPOSITIONS FROM A CHLOROPHENOL, AN
ALDEHYDE, AND A CHLOROEPOXYALKANE
Filed May 27, 1950
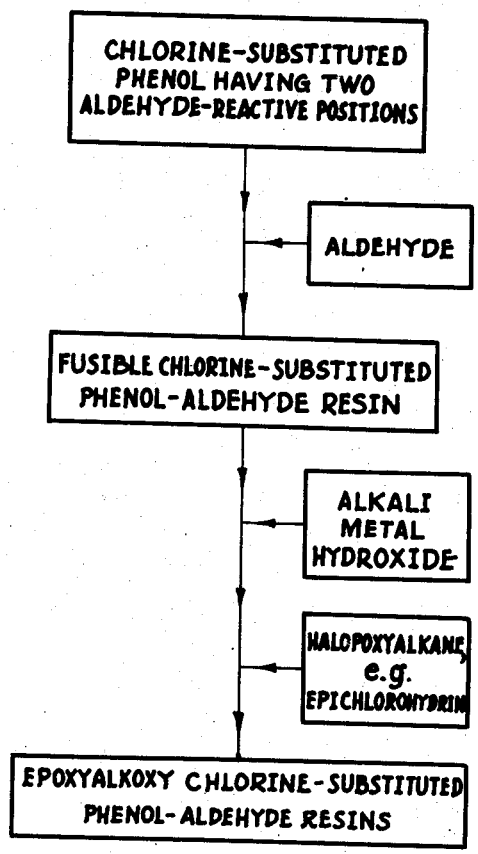
INVENTOR.
GAETANO F. D'ALELIO.
BY Walter J. Monacelli
his ATTORNEY.

Patented Nov. 10, 1953

2,658,884

UNITED STATES PATENT OFFICE 2,658,884

POLYMERIC COMPOSITIONS FROM A CHLOROPHENOL, AN ALDEHYDE, AND A CHLOROEPOXYALKANE

Gaetano F. D'Alelio, Pittsburgh, Pa., assignor to Koppers Company, Inc., a corporation of Delaware Application May 27, 1950, Serial No. 164,840

24 Claims. (Cl. 260—53)

This invention relates to new polymeric products. Generally it relates to resinous compositions of matter comprising the reaction products of (1) halo-epoxyalkanes and (2) fusible chlorine-substituted phenolic-aldehyde resins, such phenolic-aldehyde epoxyalkyl ether resin products being hereinafter referred to as epoxyalkoxy aryl resins. It deals particularly with soluble, fusible phenolic-aldehyde epoxyalkyl ether resins which are convertible to insoluble, infusible, fire-retardant resins.

For many purposes, it is desirable that a normally resinous material be capable of conversion, preferably in a short time and under relatively mild or easily effected conditions, to an insoluble, infusible condition. Such a composition is ideally suited for the production of synthetic fibers and other shaped articles, adhesive compositions, surface coatings and the like. The new epoxyalkoxy aryl resins of this invention, because of their particular molecular structure and their active cross-linking ability, are capable of satisfying these conditions, either by themselves or in conjunction with other inorganic or organic molecules, and especially by co-reaction with other resinous and polymeric molecules. The new easily-convertible resins of this invention may vary from mobile liquids to hard solid bodies and are useful in the preparation and product of improved heat- and solvent-resistant compositions. Thus they are especially valuable in the preparation of fibers, cements, surface coatings, impregnants, molding compositions and the like.

For example, the thermoplastic resins of this invention can be incorporated into spinning compositions which have reactive hydrogen therein, such as cellulose acetate, cellulose ether-acetate, partially or completely saponified polyvinyl acetate, polyamides and other compositions to give improved products.

In addition to such improved fiber-forming compositions, etc., from the epoxyalkoxy aryl resins of this invention, these polymeric materials are also adaptable to the preparation of compositions suitable for use as cements, impregnants, coatings, etc. Various modifications of the resins which are very effective for such purposes are described more fully in applicant's copending patent application Ser. No. 164,839, filed the same date herewith.

It has been proposed that certain compounds comprising phenolic epoxyalkylethers be used in making resins for various purposes, for example, the epoxypropyl polyethers of polyhydric phenols, such as bisphenol (or p,p'-dihydroxydiphenyl dimethyl methane), resorcinol, etc. However, in resinifying such compounds the epoxy groups are used in forming the linear polymer molecules as well as in cross-linking the polymer chains. It has been found more advantageous in the present invention to have a linear polymer chain already formed to a desired degree by the use of aldehyde condensing agents and to have the epoxy groups used mainly for cross-linking polymer chains. Since the polymer chains in the products of the present invention are already formed to a considerable extent the time required for completing the cross-linking is notably less than when linear polymer chains must be formed previous to or simultaneous with cross-linking as in the case of the above-mentioned compounds. Moreover, since most of the commonly used aldehydes, such as formaldehyde, are less expensive than the halo-epoxyalkanes, such as epichlorohydrin, it is more advantageous economically, as well as for other reasons, to use less halo-epoxyalkanes by utilizing these mainly for cross-linking purposes as in the present invention. The process outlined in the flow sheet of the accompanying drawing shows a method of preparing the resins of this invention.

The resins of the present invention comprise polymeric materials represented at least in part by the formula

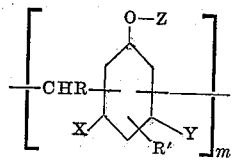

wherein

R is a substituent of the class consisting of hydrogen and alkyl, alkylene, aryl, aralkyl, alkaryl, cycloalkyl and furyl groups;

X and Y are substituents selected from the class consisting of hydrogen, chlorine and alkyl and hydroxyl groups;

R' is chlorine or a hydrocarbon group of the class consisting of alkyl, aryl, aralkyl, and alkaryl groups;

at least one of the groups X, Y and R' is chlorine;

$m$ is an integer having a value of at least three; and

Z is a substituent of the class consisting of hydrogen and epoxyalkyl groups, at least one Z per polymer molecule being an epoxyalkyl group and said epoxyalkyl groups having the formula

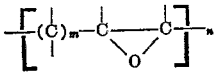

wherein $n$ is an integer having a value advantageously no greater than 8, and the unoccupied valences within the bracket of the formula are satisfied by substituents of the class consisting of hydrogen and alkyl groups of no more than 7 carbon atoms, the number of carbon atoms in any epoxyalkyl group totaling no more than 10 carbon atoms.

The phenolic-aldehyde epoxyalkyl ether resins of this invention can be prepared by the reaction of a thermoplastic chlorine-substituted phenolic-aldehyde resin, more fully described below, with a halo-epoxyalkane of the formula

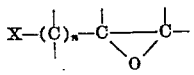

where X is a halogen atom, such as chlorine, bromine, etc., $n$ is an integer having a value advantageously no greater that 8, and the unoccupied valences of the formula are satisfied by hydrogen or hydrocarbon groups. When one phenolic hydroxy group per phenolic unit of the thermoplastic phenolic-aldehyde resin is substituted by an epoxyalkyl group, the resultant resin product is believed to be represented at least in part by the formula

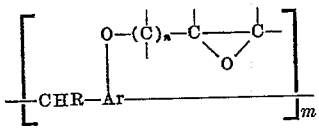

where Ar represents the aromatic nucleus of the chlorine-substituted phenolic starting compound, CHR represents the methylene or methylene-substituted bridge resulting from the aldehyde condensation with the phenolic starting compound, $n$ is an integer having a value advantageously no greater than 8, and $m$ is an integer having a value of at least 3.

Fusible chlorine-substituted phenolic-aldehyde resins suitable for use in the practice of this invention can be prepared from chlorine-substituted phenols having only two aldehyde-reactive positions available and having the formula

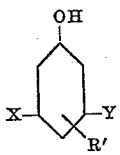

wherein X and Y may be hydrogen, chlorine, an alkyl group or hydroxyl group, and R' is a chlorine or hydrocarbon group such as alkyl, aryl, aralkyl, alkaryl, etc. By having only two positions available for condensation with aldehyde, the thermoplastic nature of the condensation product is generally assured since there is little possibility of cross-linking condensation which might cause premature thermosetting. Typical phenols of the above formula which are particularly suitable for the practice of this invention are: o- and p-chloro-phenols, 2,5-dichloro-phenol, 2,3-dichloro-phenol, 3,4 - dichloro-phenol, 2-chloro-3-methyl-phenol, 2 - chloro - 5 - methyl-phenol, 3-chloro-2-methyl-phenol, 5 - chloro-2-methyl - phenol, 3-chloro-4-methyl-phenol, 4-chloro-3-methyl-phenol, 4 - chloro-3-ethyl-phenol, 4-chloro-3-isopropyl-phenol, 3 - chloro-4-phenyl - phenol, 3,5 - dichloro-4-methyl-phenol, 3,5-dichloro-5-methyl-phenol, 3,5 - dichloro-2-methyl-phenol, 2,3 - dichloro-5-methyl-phenol, 2,5-dichloro-3-methyl-phenol, 3 - chloro-4,5-dimethyl-phenol, 4-chloro-3,5-dimethyl-phenol, 2-chloro - 3,5 - dimethyl-phenol, 5-chloro-2,3-dimethyl - phenol, 5 - chloro-3,4-dimethyl-phenol, 2,3,5-trichloro-phenol, 3,4,5-trichloro-phenol, 4-chloro - resorcinol, 4,5-dichloro-resorcinol, 4-chloro-5-methyl-resorcinol, 5 - chloro-4-methyl-resorcinol, etc.

As condensing agent any aldehyde may be used which will condense with the particular phenol being used, including formaldehyde, acetaldehyde, propionaldehyde, butyraldehyde, heptaldehyde, benzaldehyde, furfuraldehyde, glyoxal, etc., or compounds capable of engendering aldehydes such as para-formaldehyde, hexamethylene tetraamine, etc. The aldehydes can also be used in the form of a solution, such as the commercially available formalin. To give dispersible resins suitable for use herein, the ratio of reagents should be greater than 0.5 mole or 50 mole percent of aldehyde ultimately combined per mole of phenol. Theoretically, in order to have complete conversion to resinous products, there should be at least about 67 mole percent of aldehyde combined per mole of phenol. In actual practice, however, it is necessary to use at least about 75–80 mole percent of aldehyde since some aldehyde is lost during the reaction, the amount lost depending on the conditions of the reaction. For example, the use of 60 mole percent aldehyde usually gives only about 50 mole percent combined aldehyde, thus giving a non-resinous product of the bis-phenol type. However, if excess is used so that 60 mole percent of the aldehyde is combined with the phenol the product is a mixture of resin and bis-phenol compound. When amounts larger than about 67 mole percent up to a theoretical mole percent of 100 are combined, higher molecular-weight polymers result.

Any of the well-known procedures for carrying out phenol-aldehyde condensations can be used in preparing the fusible resins suitable for the practice of this invention. Ordinarily the phenol and the aldehyde are condensed by reacting them together in the presence of an acidic or alkaline condensation catalyst until the products have become relatively viscous. Solvents may be employed. Acidic catalysts are sometimes preferred because of the ease with which the condensation may be controlled. Elevated temperatures naturally accelerate the rate of reaction. The preparation of a typical water-dispersible resin is illustrated by the following procedure:

A mixture of 256 parts of p-chlorophenol, 162 parts of a 37% aqueous solution of formaldehyde and 27 parts of water is agitated and heated to a temperature of 90° C. Two hundred parts of water and 0.2 part of oxalic acid are added, and refluxing is continued for several hours. The heating and agitation is then stopped and the resinous layer separated from the aqueous layer. The solvent is removed by vacuum distillation and then heating is continued at a reduced pressure of about 2 mm. of mercury and a temperature of about 100° C. for about 4 hours to give a resinous product which is dispersible in aqueous sodium hydroxide solution.

When a ratio of 3 mole of p-chlorophenol to 2 moles of formaldehyde are combined, the condensation gives a product having a structure predominantly as follows:

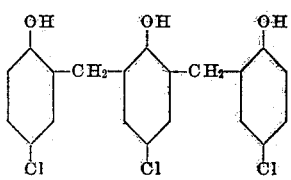

With a ratio of 6 moles of p-chlorophenol to 5 moles of combined formaldehyde the product is predominantly:

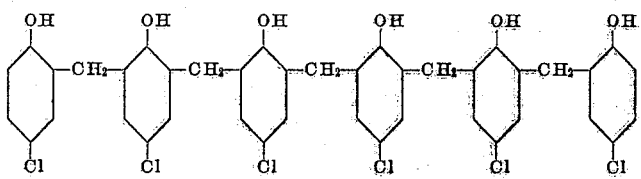

It is possible for the purposes of this invention to use combinations of chlorophenols having different numbers of reactive positions, for example, a limited amount of a phenol having only one reactive position may be used with a phenol having two reactive positions. Thus, 2 moles of 2,4-dichlorophenol, 4 moles of p-chlorophenol and 5 moles of combined formaldehyde give a suitable product which may be represented as predominantly:

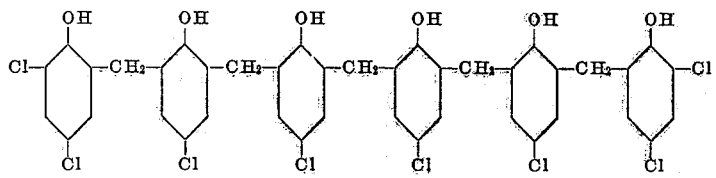

Substituted phenols having one reactive position may be represented by the formulas

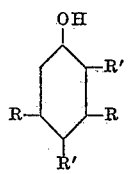

and

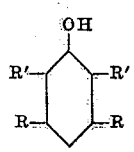

where R' is a chlorine or hydrocarbon group and R is hydrogen, chlorine or a hydrocarbon group. Therefore by varying the mole ratio between substituted phenols having two reactive positions and those having one reactive position as well as by varying the mole ratio of aldehyde to total phenolic material, a wide variety of molecular weights may be obtained in the resin products.

For the preparation of the epoxyalkoxy aryl resins of this invention, the phenolic-aldehyde resin is dissolved or dispersed in an alkaline medium and the chloride (or bromide) of the monohydroxy epoxyalkane is added to the solution or dispersion. The amount or proportion of the chloro-epoxyalkane to be added depends on the number of epoxyalkane groups desired to be substituted on the resin. If each hydroxy group in the resin is to be converted to an epoxyalkyl ether, an excess of one molecular weight of chloroepoxyalkane is added for each equivalent weight of resin based on the number of hydroxy groups in the resin; e. g., one molecular weight of chloroepoxyalkane per hydroxy group in the amount of resin used. If it is desired that only a fraction of the hydroxy groups are to be reacted, then the number of molecular weights of the chloroepoxyalkane are reduced proportionately. Sufficient strong base or hydrohalide acceptor, such as sodium, potassium or barium hydroxide, should be present either as a sodium resinate (phenolate) salt or in the free state to react with the chlorine of the chloroepoxyalkane or to neutralize any hydrogen chlorine which may be formed. The reaction may be promoted by heating, temperatures of 60 to 150° C. generally being suitable for this purpose. The reactions may be represented as follows:

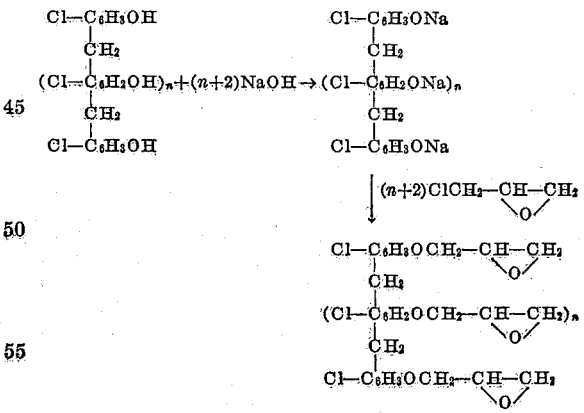

The polymeric ether is allowed to precipitate from the dispersion or solution, and when an aqueous medium has been used, is easily separated from the resultant salt solution.

It is not necessary that all the hydroxy groups be etherized by the halo-epoxyalkanes but at least one or more hydroxy groups per resin molecule should eventually be substituted by an epoxyalkane group. It is sometimes desirable that some of the hydroxy groups be etherized or esterified advantageously before etherification by the haloepoxyalkane. The auxiliary etherification may be accomplished by reaction of the sodium resinate with halides or sulfates such as methyl chloride, isopropyl chloride, benzyl chloride, dimethyl sulfate, etc. Esterification may be effected with carboxylic acids, acid anhydrides, acid chlorides, or by alcoholysis of esters. It is desirable sometimes to partially esterify with a drying oil fatty acid.

A typical procedure for preparing the epoxyalkyl ether resins of this invention is as follows:

A resin is prepared according to the procedure described above, using 774 parts of p-chlorophenol and 450 parts of a 37% aqueous solution of formaldehyde which gives approximately a 6-5 mole ratio of p-chlorophenol combined with formaldehyde. The resin product is dispersed in 2000 parts of water containing 128 parts of sodium hydroxide. The resultant mixture is heated to 70–80° C. and, with agitation, 300 parts of epichlorohydrin is added. Then the temperature is raised to 85–100° C. for an hour to complete the reaction. At this point the agitation is stopped and the resin layer is separated from the sodium chloride-water layer.

The particular properties and purpose for which the epoxyalkoxy aryl resin is to be used will determine the number of epoxyalkoxy groups which should be added and the number and type of modifying ether and ester groups which can be used. When the epoxyalkoxy aryl ether-resin is to serve as a cross-linking agent for a polymeric material having reactive hydrogens, there should be at least two epoxyalkoxy groups present per resin molecule. If the reactive hydrogen-containing material is to serve as a cross-linking agent, the epoxyalkoxy aryl resin may have as little as one epoxyalkoxy group per resin molecule. When the epoxyalkoxy aryl resin is to be further resinified by coupling through the epoxy groups, there should be at least one epoxy group per resin molecule, but a plurality of epoxy groups will give faster reaction and cross-linking to an infusible resin.

While glycidyl ethers, such as derived from epichlorohydrin, are particularly preferred in the practice of this invention, the epoxyalkoxy aryl resins containing higher epoxyalkoxy groups are also suitable. These are prepared by substituting for epichlorohydrin such representative corresponding chlorides or bromides of mono-hydroxy epoxyalkanes as 1-chloro-2,3-epoxybutane, 1-chloro-3,4-epoxybutane, 2-chloro-3,4-epoxybutane, 1-chloro-2-methyl-2,3-epoxypropane, 1-bromo-2,3-epoxypentane, 2-chloromethyl-1,2-epoxybutane, 1-bromo-4-methyl-3,4-epoxypentane, 1-bromo-4-ethyl-2,3-epoxypentane, 4-chloro-2-methyl-2,3-epoxypentane, 1-chloro-2,3-epoxyoctane, 1-chloro-2-methyl-2,3-epoxyoctane, or 1-chloro-2,3-epoxy-decane. Although it is possible to use halo-epoxyalkanes having a greater number of carbon atoms than indicated above, there is generally no advantage in using those having a total of more than 10 carbon atoms.

The epoxyalkoxy aryl resins of this invention are polymerized by subjecting them to an epoxide coupling reaction in the presence of a so-called Friedel-Crafts catalyst or in the presence of an inorganic or organic base. Suitable Friedel-Crafts catalysts include aluminum chloride, aluminum bromide, zinc chloride, zinc bromide, boron trifluoride, silicon tetrachloride, stannic chloride, stannic bromide, titanium tetrachloride, bismuth trichloride and the like. Stannic chloride has been found to be particularly advantageous due to its high activity. Inorganic basic catalysts which may be used are alkali hydroxides, calcium oxide, sodium amide, etc., and organic catalysts which are very efficient are amines, especially secondary aliphatic amines such as diethylamine, dibutyl amine, diethylene triamine, piperidine and derivatives of these amines such as piperidine benzoate. Other satisfactory amines are trimethylamine, triethylamine, triethanolamine, methyl di-N-propylamine, guanidine, guanidine derivatives, etc. About 1% to 10% of catalyst is a suitable quantity to effect the desired polymerization. While the polymerization can be effected through the epoxide coupling reaction of the pure ether, it may be preferred sometimes to effect the polymerization in the presence of a solvent. Inert solvents can be used if desired, such as petroleum ether, chloroform, benzene, ethyl or isopropyl ethers, etc. The polymerization can be effected over a considerable range of temperature. Thus, temperatures from —50° C. to about 100° C. are suitable, preferably temperatures of 0° to 60° C.

The invention as hereinbefore set forth is embodied in particular form and manner but may be variously embodied within the scope of the claims hereinafter made.

What is claimed is:

1. A resin comprising a polymeric material being represented at least in part by the formula

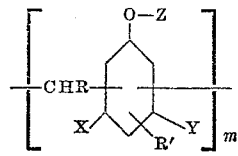

wherein

R is a substituent of the class consisting of hydrogen and alkyl, alkylene, aryl, aralkyl, alkaryl, cycloalkyl and furyl groups;

X and Y are substituents selected from the class consisting of hydrogen, chlorine and alkyl and hydroxyl groups;

R' is a substituent of the class consisting of chlorine, alkyl, aryl, aralkyl, and alkaryl groups;

at least one member of the group consisting of X, Y and R' is chlorine;

m is an integer having a value of at least three; and

Z is a substituent of the class consisting of hydrogen and epoxyalkyl groups, at least one Z per polymer molecule being an epoxyalkyl group and said epoxyalkyl groups having the formula

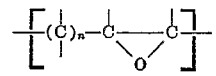

wherein $n$ is an integer having a value no greater than 8, and the unoccupied valences within the bracket of the formula are satisfied by substituents of the class consisting of hydrogen and alkyl groups of no more than 7 carbon atoms, the number of carbon atoms in any epoxyalkyl group totaling no more than 10 carbon atoms.

2. A resin of claim 1, in which Z is the glycidyl group.

3. A resin of claim 2, in which the said polymeric material is derived from p-chlorophenol.

4. A resin of claim 2, in which the said polymeric material is derived from o-chlorophenol.

5. A resin of claim 2, in which the said polymeric material is derived from dichlorophenol.

6. A resin of claim 2, in which the said polymeric material is derived from 3,4-dichlorophenol.

7. A resin of claim 2, in which R is hydrogen.

8. A resin of claim 2, in which R is the furyl groups.

9. A resin of claim 2, in which R is hydrogen and said polymeric material is derived from p-chlorophenol.

10. A resin of claim 2, in which R is hydrogen and said polymeric material is derived from o-chlorophenol.

11. A resin of claim 2, in which R is hydrogen and said polymeric material is derived from dichlorophenol.

12. A resin of claim 2, in which R is hydrogen and said polymeric material is derived from 3,4-dichlorophenol.

13. A process of preparing a resin comprising the step of condensing a chloroepoxyalkane with an alkali metal salt of a fusible aldehyde-phenol resin, said chloroepoxyalkane having the formula

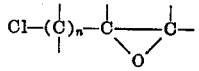

wherein $n$ is an integer having a value no greater than 8; and the unoccupied valences are satisfied by members of the class consisting of hydrogen and alkyl groups of no more than 7 carbon atoms, the number of carbon atoms in the chloroepoxyalkane totaling no more than 10 carbon atoms; and said aldehyde-phenol resin having at least three chlorine-substituted phenol radicals per polymer molecule having the formula

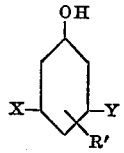

wherein X and Y are substituents from the class consisting of hydrogen, chlorine and alkyl and hydroxyl groups; R' is a substituent of the class consisting of chlorine and alkyl, aryl, aralkyl and alkaryl groups, and the mole ratio of combined aldehyde to phenol in said aldehyde-phenol resin being no more than 1 to 1.

14. A process of claim 13, in which the aldehyde-phenol resin is a p-chlorophenol resin.

15. A process of claim 13, in which the aldehyde-phenol resin is an o-chlorophenol resin.

16. A process of claim 13, in which the aldehyde-phenol resin is a dichlorophenol resin.

17. A process of claim 13, in which the aldehyde-phenol resin is a formaldehyde resin.

18. A process of claim 13, in which the aldehyde-phenol resin is a furfuraldehyde resin.

19. A process of claim 13, in which the aldehyde-phenol resin is a formaldehyde-p-chlorophenol resin.

20. A process of claim 13, in which the chloroepoxyalkane is epichlorohydrin.

21. A process of claim 20, in which the aldehyde-phenol resin is a formaldehyde-chlorophenol resin.

22. A process of claim 20, in which the aldehyde-phenol resin is a formaldehyde-p-chlorophenol resin.

23. A process of claim 20, in which the aldehyde-phenol resin is a formaldehyde-o-chlorophenol resin.

24. A process of claim 20, in which the aldehyde-phenol resin is a formaldehyde-dichlorophenol resin.

GAETANO F. D'ALELIO.

References Cited in the file of this patent

UNITED STATES PATENTS

| Number | Name | Date |
|---|---|---|
| 2,076,624 | De Groote | Apr. 13, 1937 |
| 2,499,365 | De Groote | Mar. 7, 1950 |